US012639075B2

(12) United States Patent
Liu et al.

(10) Patent No.: US 12,639,075 B2
(45) Date of Patent: May 26, 2026

(54) REDUCING POWER CONSUMPTION BY HARDWARE ACCELERATOR DURING GENERATION AND TRANSMISSION OF MACHINE LEARNING INFERENCES

(71) Applicant: Google LLC, Mountain View, CA (US)

(72) Inventors: Jack Liu, Saratoga, CA (US); Dong Hyuk Woo, San Jose, CA (US)

(73) Assignee: Google LLC, Mountain View, CA (US)

( * ) Notice: Subject to any disclaimer, the term of this patent is extended or adjusted under 35 U.S.C. 154(b) by 603 days.

(21) Appl. No.: 18/021,125

(22) PCT Filed: Aug. 13, 2020

(86) PCT No.: PCT/US2020/046171
§ 371 (c)(1),
(2) Date: Feb. 13, 2023

(87) PCT Pub. No.: WO2022/035433
PCT Pub. Date: Feb. 17, 2022

(65) Prior Publication Data
US 2023/0315478 A1      Oct. 5, 2023

(51) Int. Cl.
*G06F 9/38*          (2018.01)
*G06F 9/54*          (2006.01)
(52) U.S. Cl.
CPC ............ *G06F 9/3877* (2013.01); *G06F 9/544* (2013.01)
(58) Field of Classification Search
None
See application file for complete search history.

(56) References Cited

U.S. PATENT DOCUMENTS

2019/0385001 A1    12/2019   Stark
2020/0134357 A1*    4/2020   Zhuravlev ........ G06V 30/18057

FOREIGN PATENT DOCUMENTS

CN          109564575        4/2019
EP            1598770        11/2005

OTHER PUBLICATIONS

L. A. de Oliveira Junior and E. Barros, "An FPGA-based Hardware Accelerator for Scene Text Character Recognition," 2018 IFIP/IEEE International Conference on Very Large Scale Integration (VLSI-SoC), Verona, Italy, 2018, pp. 125-130, doi: 10.1109/VLSI-SoC.2018.8644776. (Year: 2018).*

(Continued)

*Primary Examiner* — S. Sough
*Assistant Examiner* — Selena Sabah Nahra
(74) *Attorney, Agent, or Firm* — Fish & Richardson P.C.

(57)                ABSTRACT

A hardware accelerator can receive, from a host processor, a slice of input data at a time-step. The hardware accelerator can process the input data using a machine learning model deployed on the hardware accelerator to compute a respective probability among multiple probabilities for each of multiple classes. The respective probability for each class being a likelihood that content in the slice belongs to the class. The hardware accelerator can determine, from the multiple probabilities, a preset number of highest probabilities for the slice of input data. The hardware accelerator can transmit the preset number of highest probabilities for the slice to the host processor. Related apparatus, systems, techniques and articles are also described.

20 Claims, 7 Drawing Sheets

PROCESS PERFORMED BY HOST PROCESSOR

502 | RECEIVE, FROM APPLICATION, INPUT DATA AND REQUEST TO GENERATE OUTPUT BASED ON INPUT DATA

504 | PROCESS INPUT DATA BASED ON STRUCTURAL SPECIFICATIONS OF HARDWARE ACCELERATOR TO GENERATE PROCESSED INPUT DATA

506 | TRANSMIT, TO HARDWARE ACCELERATOR, PROCESSED INPUT DATA AND INSTRUCTIONS TO GENERATE TOP K PROBABILIITES FOR EACH SLICE

508 | RECEIVE TOP K PROBABILITIES FOR EACH SLICE FROM HARDWARE ACCELERATOR

510 | DETERMINE OUTPUT FOR EACH SLICE BASED ON TOP K PROBABILITIES FOR THAT SLICE

512 | TRANSMIT OUTPUT FOR ENTIRE INPUT DATA TO APPLICATION

(56) References Cited

OTHER PUBLICATIONS

Bougioukou et al., "Cloud services using hardware accelerators: The case of handwritten digits recognition," Presented at 6th International Conference on Modern Circuits and Systems Technologies (MOCAST), Thessaloniki, Greece, May 4-6, 2017, 4 pages.

Boyer et al., "Improving GPU performance prediction with data transfer modeling." 2013 IEEE International Symposium on Parallel & Distributed Processing, Workshops and Phd Forum. IEEE, May 2013, 10 pages.

International Preliminary Report on Patentability in International Appln. No. PCT/US2020/046171, mailed on Feb. 23, 2023, 10 pages.

International Search Report and Written Opinion in International Appln. No. PCT/US2020/046171, mailed on May 28, 2021, 17 pages.

Mandal et al., "Frequency Count Based Two Stage Classification for Online Handwritten Character Recognition" 2016 International Conference on Signal Processing and Communications, Jun. 12, 2016, 5 pages.

Phat et al., "Deep Learning Accelerator on FPGA Using Handwritten Digit Recognition for Example" 2018 IEEE International Conference on Consumer Electronics—Taiwan, May 19, 2018, 2 pages.

Chowdhury et al., "An efficient end-to-end neural model for handwritten text recognition," CoRR, Submitted on Jul. 20, 2018, arXiv:1807.07965v1, 11 pages.

Harikrishnan et al., "Handwritten digit recognition with feed-forward multi-layer perceptron and convolutional neural network architectures," Presented at 2nd International Conference on Innovative Mechanisms for Industry Applications (ICIMIA), Bangalore, India, Mar. 5-7, 2020, pp. 398-402.

Office Action in Chinese Appln. No. 202080104247.1, mailed on Jun. 21, 2024, 18 pages (with English translation).

Office Action in European Appln. No. 20780390.9, mailed on Jun. 25, 2024, 7 pages.

* cited by examiner

*OVERALL SYSTEM*

*PROCESS PERFORMED BY APPLICATION*

RECEIVE INPUT DATA

302

TRANSMIT INPUT DATA TO HOST PROCESSOR

304

RECEIVE, FROM HOST PROCESSOR, OUTPUT

306

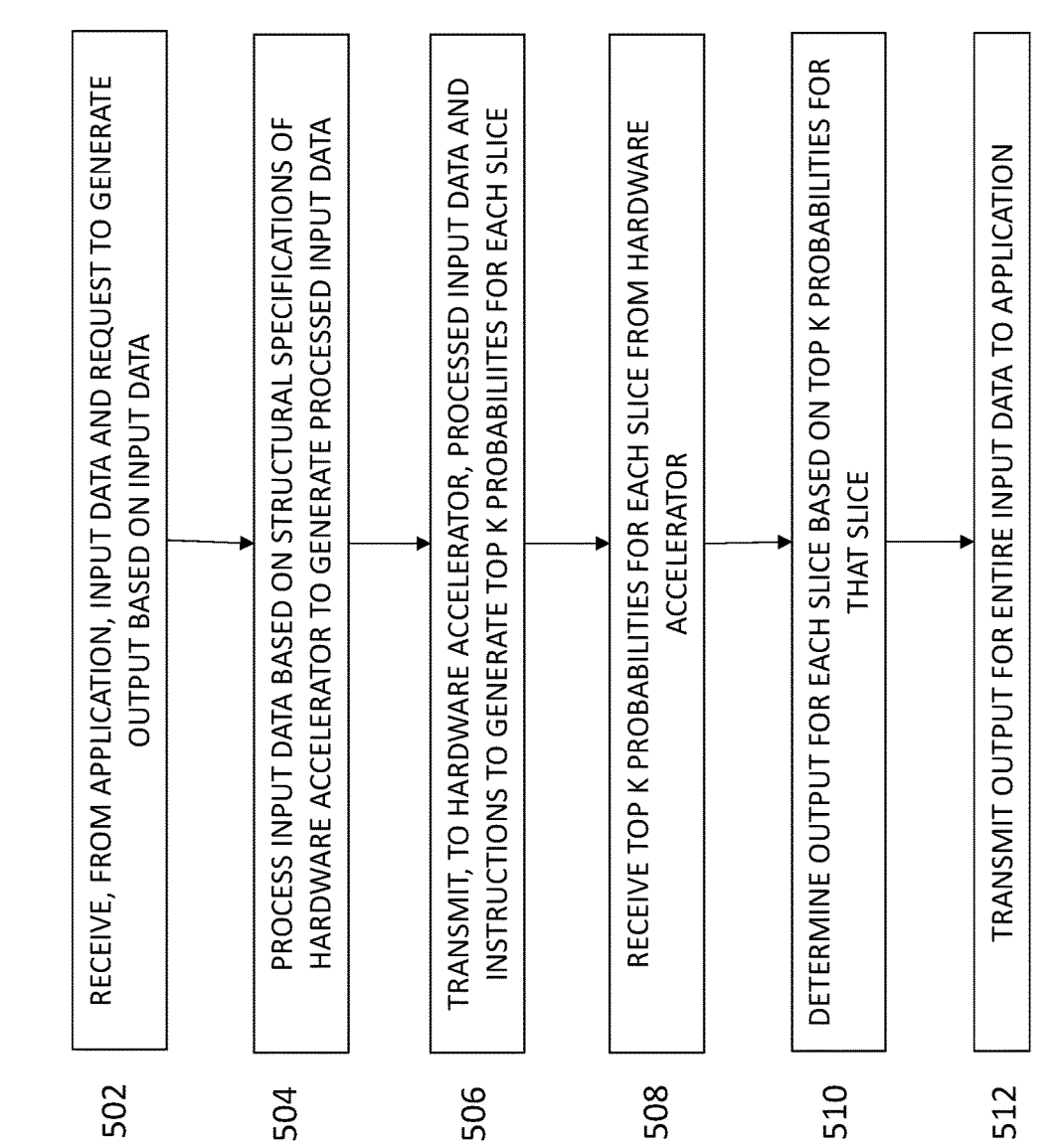

_PROCESS PERFORMED BY HOST PROCESSOR_

502 — RECEIVE, FROM APPLICATION, INPUT DATA AND REQUEST TO GENERATE OUTPUT BASED ON INPUT DATA

504 — PROCESS INPUT DATA BASED ON STRUCTURAL SPECIFICATIONS OF HARDWARE ACCELERATOR TO GENERATE PROCESSED INPUT DATA

506 — TRANSMIT, TO HARDWARE ACCELERATOR, PROCESSED INPUT DATA AND INSTRUCTIONS TO GENERATE TOP K PROBABILIITES FOR EACH SLICE

508 — RECEIVE TOP K PROBABILITIES FOR EACH SLICE FROM HARDWARE ACCELERATOR

510 — DETERMINE OUTPUT FOR EACH SLICE BASED ON TOP K PROBABILITIES FOR THAT SLICE

512 — TRANSMIT OUTPUT FOR ENTIRE INPUT DATA TO APPLICATION

FIG. 5

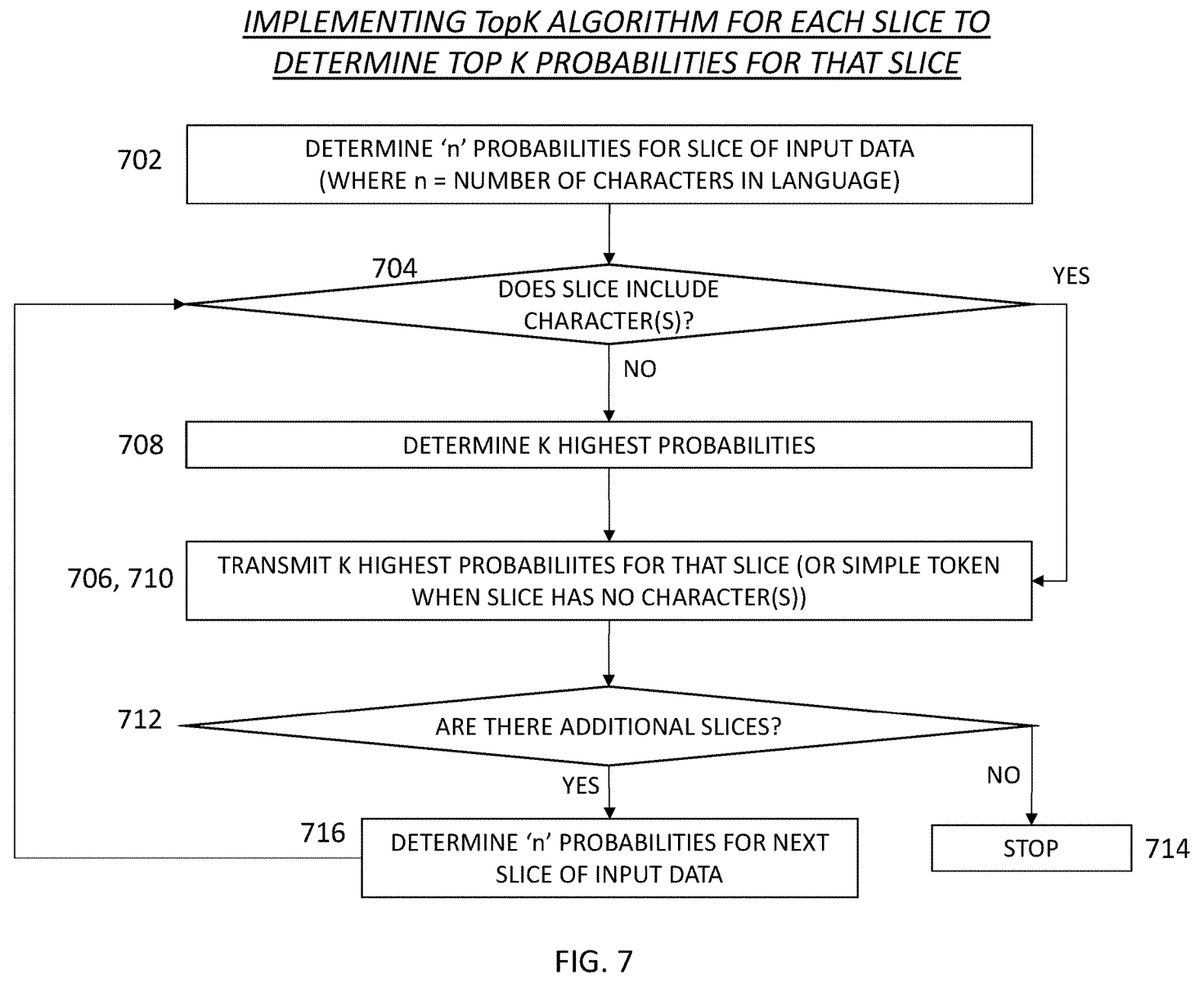

*IMPLEMENTING TopK ALGORITHM FOR EACH SLICE TO DETERMINE TOP K PROBABILITIES FOR THAT SLICE*

702 — DETERMINE 'n' PROBABILITIES FOR SLICE OF INPUT DATA (WHERE n = NUMBER OF CHARACTERS IN LANGUAGE)

704 — DOES SLICE INCLUDE CHARACTER(S)?

YES

NO

708 — DETERMINE K HIGHEST PROBABILITIES 706, 710 — TRANSMIT K HIGHEST PROBABILITES FOR THAT SLICE (OR SIMPLE TOKEN WHEN SLICE HAS NO CHARACTER(S))

712 — ARE THERE ADDITIONAL SLICES?

NO

714 — STOP

YES

716 — DETERMINE 'n' PROBABILITIES FOR NEXT SLICE OF INPUT DATA

FIG. 7

REDUCING POWER CONSUMPTION BY HARDWARE ACCELERATOR DURING GENERATION AND TRANSMISSION OF MACHINE LEARNING INFERENCES

CROSS-REFERENCE TO RELATED APPLICATION

This application is a National Stage Application under 35 U.S.C. § 371 and claims the benefit of International Application No. PCT/US2020/046171, filed on Aug. 13, 2020. The disclosure of the prior application is considered part of and is incorporated by reference in the disclosure of this application.

TECHNICAL FIELD

The subject matter described herein relates to reducing the amount of power a hardware accelerator consumes while implementing a machine learning model to generate inferences in response to input received from a software application running on a computing device.

BACKGROUND

Often, a mobile phone runs a software application that is configured to receive an input and provide an output in response, where the generation of the output involves a large number of computations. One such application is an optical character recognition (OCR) application that is configured to receive an image and provide an output recognizing characters in that image. Recognition of such characters in the image usually involves performing a large number of computations. Such computations are conventionally performed by a host processor of the mobile phone. However, due to the large number of such computations, there are often delays and thus undesirable latency in the functionality of such applications.

SUMMARY

This disclosure generally relates to expediting generation of an output in response to data input on a software application (also referred to as simply as an application herein) running on a computing device. In one example, such application is an optical character recognition (OCR) application, the input data is an image that has text, and the output involves recognition of text in that image. A hardware accelerator coupled to a host processor of the computing device can receive, from the host processor, a slice of input data (e.g. slice of an image of text) at a time-step. The hardware accelerator can process the slice of input data (e.g. slice of the image of text) using a machine learning model (e.g. neural network model) deployed on the hardware accelerator to compute respective probabilities for multiple classes (e.g. probability for each corresponding character of multiple characters of a language of the text, wherein number of classes equals to total number of characters in that language). The respective probability for each class can be a likelihood that content in the slice belongs to the class. The hardware accelerator can determine, from the probabilities, a preset number of (e.g. "K," where K is an integer) highest (i.e. top) probabilities for the slice of input data. The process of determining the top K probabilities is also referred to herein as the TopK algorithm. In the OCR example, classes associated with the top K probabilities represent the characters recognized (i.e. identified) in the image slice. The hardware accelerator can transmit the preset number of highest probabilities for the slice to the host processor, which can transmit the recognized characters to the application running on the computing device. The hardware accelerator can process other slices of input data (e.g. other slices of the image) to determine classes in the entire input data (e.g. recognize characters in the entire image).

In one aspect, a hardware accelerator can receive, from a host processor, a slice of input data at a time-step. The hardware accelerator can process the input data using a machine learning model deployed on the hardware accelerator to compute a respective probability of a plurality of probabilities for each of a plurality of classes. The respective probability for each class being a likelihood that content in the slice belongs to the class. The hardware accelerator can determine, from the plurality of probabilities, a preset number of highest probabilities for the slice of input data. The hardware accelerator can transmit the preset number of highest probabilities for the slice to the host processor.

In some implementations, one or more of the following can be additionally implemented either individually or in any feasible combination. The host processor can receive the input data from an application configured to be executed on a computing device implementing the host processor and the hardware accelerator. The host processor can transmit data characterizing the determined classes within the input data to the application. The hardware accelerator can be communicatively coupled to the host processor via a Peripheral Component Interconnect Express (PCIe) bus. The hardware accelerator can store the preset number of highest probabilities for the time-step of the plurality of time-steps within a buffer of the hardware accelerator. A total count of the probabilities can be equal to a total number of classes. The preset number is one. The input data can include one or more other slices in addition to the input slice. The hardware accelerator can determine, for each other slice and from the plurality of probabilities, the preset number of highest probabilities for the other slice. The hardware accelerator can store the preset number of highest probabilities for each of the other slices. The transmitting of the preset number of highest probabilities for the slice to the host processor can include: transmitting, by the hardware accelerator, the preset number of highest probabilities for each of the slices of the input data collectively to the host processor, wherein the host processor can use the preset number of highest probabilities for slice. The hardware accelerator can store the preset number of highest probabilities for each time-step of the plurality of time-steps within a buffer of the hardware accelerator.

In another aspect, a hardware accelerator is described that includes at least one compute unit and a machine-readable medium that stores instructions that, when executed by the at least one compute unit, cause the at least one compute unit to perform operations noted above. In yet another aspect, a non-transitory computer program product storing instructions that, when executed by at least one compute unit, cause the at least one compute unit to perform operations noted above.

The subject matter described herein provides many advantages. For example, the hardware accelerator described herein can include several computing units (which can also be referred to as compute tiles), among which computations of the machine learning model (e.g. neural network)—which is deployed to compute respective probabilities for multiple classes (e.g. probability for each corresponding character of multiple characters of a language of the text, wherein number of classes equals to total number of characters in that language)—can be distributed. Such distribution of computations across the compute tiles allow processing the neural network by using a reduced number of instructions as compared to number of instructions that would have been required had the neural network been processed by the host processor. Such reduction in the number of instructions increases the speed with which probabilities for multiple classes are computed, thereby reducing latency in the process of generating an output in response to the input data (e.g. determining and/or display-ing characters recognized within an image containing text in response to receipt of such text).

Further, the hardware accelerator determines, from the probabilities, a preset number of (e.g. "K," where K is an integer) highest (i.e. top) probabilities for each slice of input data, and then transmits these top K probabilities to the host processor. This prevents the need for transmitting all of the probabilities to the host processor and having the host processor determine the top K probabilities. Therefore, the data that is transmitted over a bus—e.g. Peripheral Compo-nent Interconnect Express (PCIe) bus—connecting the hard-ware accelerator and the host processor is reduced. Such reduction of transmitted data can conserve power required by the bus. This offers significant benefits as such a bus, e.g. PCIe bus, consumes substantial power for various opera-tions.

Further, in the OCR example, the hardware accelerator can expedite the transmission of top K probabilities for the input image having text by eliminating the need to calculate and transmit top K probabilities for some slices of the input image. For example, for each slice that corresponds to part of an image that does not have any text, the hardware accelerator is prevented from calculating and transmitting such top K probability values, and instead the hardware accelerator can send a simple token (e.g. one or more bits or bytes indicating that the slice has no textual data). Prevent-ing the hardware accelerator from performing such calcu-lations and transmission can conserve the computational resources within the hardware accelerator while also reduc-ing latency in the process of generating an output in response to the input data (e.g. determining and/or displaying char-acters recognized within an image containing text in response to receipt of such text). Transmission of reduced data (e.g. the token referenced above) can further reduce the data that is transmitted over the bus—e.g. Peripheral Com-ponent Interconnect Express (PCIe) bus—connecting the hardware accelerator and the host processor, thereby further conserving power required by the bus. As the PCIe bus, or any other alternate bus that is used here, can consume substantial power for various operations, conservation of power can render significant cost savings.

Furthermore, in some implementations, the hardware accelerator can store and collect the top K probabilities for each slice (which indicate the characters in that slice) of input data in a data buffer within the hardware accelerator, and transmit the top K probabilities for all slices together to the host processor rather than transmitting the top K prob-abilities for each slice separately as it is calculated, thereby reducing the number of times data is transmitted over the bus (e.g. Peripheral Component Interconnect Express (PCIe) bus) connecting the hardware accelerator and the host pro-cessor. Reducing the number of times this bus is used can further conserve power because the hardware accelerator uses the bus a single time to transmit data rather than multiple times (even though the total data that is transmitted over the bus is the same if it was transmitted in real-time for every slice).

The details of one or more variations of the subject matter described herein are set forth in the accompanying drawings and the description below. Other features and advantages of the subject matter described herein will be apparent from the description, drawings, and claims below.

BRIEF DESCRIPTION OF DRAWINGS

FIG. 5 illustrates a process performed by the host pro-cessor.

FIG. 7 illustrates an example of the TopK algorithm performed by the accelerator to determine top K probabili-ties for each slice (or each of most slices) of the input data.

Like reference symbols in the various drawings indicate like elements.

DETAILED DESCRIPTION

This disclosure generally relates to expediting generation of an output in response to data input on an application running on a computing device. In one example, such application is an optical character recognition (OCR) appli-cation, the input data is an image that has text, and the output involves recognition of text in that image. A hardware accelerator coupled to a host processor of the computing device can receive, from the host processor, a slice of input data (e.g. slice of an image of text) at a time-step. The hardware accelerator can process the slice of input data (e.g. slice of the image of text) using a machine learning model (e.g. neural network model) deployed on the hardware accelerator to compute respective probabilities for multiple classes (e.g. probability for each corresponding character of multiple characters of a language of the text, wherein number of classes equals to total number of characters in that language). The probabilities are outputs of the machine learning model (e.g. neural network). The respective prob-ability for each class can be a likelihood that content in the slice belongs to the class. The hardware accelerator can determine, from the probabilities, a preset number of (e.g. "K," where K is an integer) highest (i.e. top) probabilities for the slice of input data. The process of determining the top K probabilities is also referred to herein as the TopK algorithm. In the OCR example, classes associated with the top K probabilities represent the characters recognized (i.e. iden-tified) in the image slice. The hardware accelerator can transmit the preset number of highest probabilities for the slice to the host processor, which can transmit the recog-nized characters to the application running on the computing device. The hardware accelerator can process other slices of input data (e.g. other slices of the image) to determine classes in the entire input data (e.g. recognize characters in the entire image).

Figure 1:
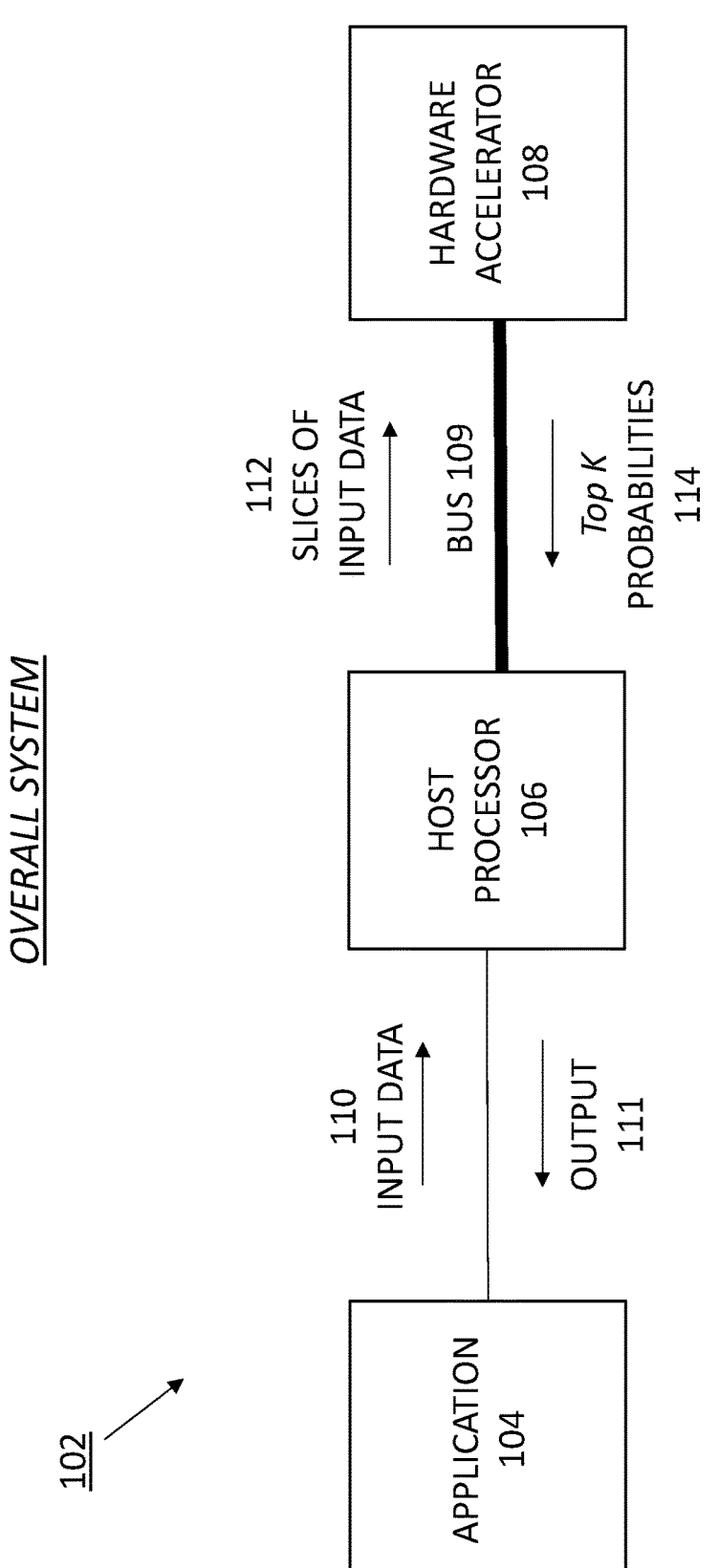
FIG. 1 illustrates a system where computational resources consumed by a hardware accelerator while generating an output in response to input data provided by the application (e.g. recognition of characters in an image of text in response to image text received and provided by the application) are reduced.

FIG. 1 illustrates an overall system 102—including an application 104, a host processor 106 and a hardware accelerator 108—where computational resources consumed by the hardware accelerator 108 while generating an output in response to input data 110 provided by the application 104 is reduced. The application 104 is a software application executed on a computing device, such as a mobile device. The host processor 106 is at least one microprocessor of that computing device. In some implementations, the hardware accelerator 108 can be embedded on that computing device. In other implementations, the hardware accelerator 108 can be physically separate from that computing device, and connected to the computing device via a wired or a wireless connection. The computing device can be a mobile device, as noted above, such as a mobile phone, a tablet computer, a phablet computer, or the like. In other implementations, the computing device can be any computer, such as a laptop, a desktop computer, a cluster of computers, and/or any combination thereof. The host processor 106 can be connected to the hardware accelerator 108 via an electronic bus, such as a Peripheral Component Interconnect Express (PCIe) bus 109.

The application 104 can be an optical character recognition (OCR) application. The OCR application can receive as input, from a user, an image that includes text, which can be typed, handwritten, or a combination thereof. The OCR application can then provide this image as input data 110 to the host processor 106. The application 104 can receive output 111 of characters identified, by the hardware accelerator 108 as described below, in the input data (e.g. image) 110. One OCR-specific example of the input data 110 and output 111 are described in further detail below with respect to FIG. 2. The process performed by the application is described below with respect to FIG. 3. While the application 104 is described as an OCR application herein, in other implementations the application can be any other application where the input data indicates classes (wherein, in the OCR example, the classes are specific characters of a language, such as Mandarin) need to be determined.

The host processor 106 can be, e.g., a microprocessor (which can also be referred to as a microcontroller) or other circuitry that performs the function of a central processing unit (CPU). The host processor 106 can receive the input data 110 (e.g. image in the OCR example) from the application 104 (e.g. OCR application). The host processor 106 can additionally receive, from the application 104, a request to generate output based on the input data 110. The output here can be classes to be identified from the input data 110. In the OCR example, the classes can be characters of text that are to be recognized from the image. Each slice can include a single character.

The host processor 106 can process the input data 110 based on structural specifications of the hardware accelerator 108. The processing of the input data 110 can include (i) determining a category associated with the input data 110 (which can be language of the text in the input image), and (ii) slicing the input data 110 into slices 112 of input data 110, such that each slice 112 conforms to the structural specifications (more particularly, limitations imposed by the structural specifications) of the hardware accelerator 108. For example, each slice 112 has a size (e.g. 32 bytes) that can be processed by the hardware accelerator in a single time-step. One example of the hardware accelerator 108, which indicates such structural specifications and associated limitations, is described below with respect to FIG. 4. In the OCR example, the language can be, for instance, Latin, Mandarin, Hindi, or any other language.

The host processor 106 can then transmit the processed input data, which includes the slices 112, to the hardware accelerator 108 in corresponding time-steps. Specifically, in each time-step, the host processor 106 transmits a single corresponding slice 112 to the hardware accelerator 108. The host processor 106 then receives, separately for each slice 112 transmitted to the hardware accelerator at a corresponding time-step, top K probabilities 114 for that slice 112 from the hardware accelerator 112. The top K probabilities 114 for each slice 112 is a result of the TopK algorithm implemented by the hardware accelerator 108 at each time-step. In other implementations (not shown), the host processor 106 can receive the top K probabilities for all slices 112 together (rather than transmitting the top K probabilities for each slice 112 separately as they are calculated), thereby reducing the number of times the bus 109 is used for data transfer (even though the same amount of data may be transferred).

The determination of top K probabilities 114 by the hardware accelerator prevents the need for transmitting all of the probabilities to the host processor 106 and having the host processor 106 determine the top K probabilities. Therefore, the data that is transmitted over a bus—e.g. Peripheral Component Interconnect Express (PCIe) bus—connecting the hardware accelerator and the host processor is reduced. Such reduction of transmitted data can conserve power required by the bus.

In the implementations where the host processor 106 receives the top K probabilities of each slice separately in real-time (as shown in FIG. 1), the host processor 106 can interpret the class (e.g. character) in that slice based on the top K probabilities and combine the interpretations for the slices 112 to generate a single combined output 111 for the entire input data 110, and can then transmit such output 111 to the application 104. In the other implementations (not shown) where the host processor 106 receives the collective top K probabilities of all slices, the host processor 106 does not need to perform any combination, and can determine the output 111 based on the received top K probabilities for all the slices, and transmit the output 111 in a single transmission. The method performed by the host processor is described by FIG. 5 in further detail below.

The hardware accelerator 108 can be computer hardware specially configured to perform some functions more efficiently than is possible in software running on the host processor 106 exclusively. The hardware accelerator 108 can receive, from the host processor 106, an identifier identifying a category (e.g. language) associated with the input data (e.g. image of text). Based on the identifier, the hardware accelerator 108 can run a machine learning model (e.g. neural network) associated with classes (e.g. language characters) of that category (e.g. language). The number of classes (e.g. characters in the OCR example) can vary for each category (e.g. language in the OCR example). For instance, in the OCR example, Latin may have a few hundred (e.g. 200) characters; Mandarin may have a few thousand (e.g. 20,000) characters; and so on. For generality, each category has 'n' classes, where n is an integer number equal to the number of classes in that category. In the OCR example, each language has 'n' characters, where n is an integer number equal to the number of characters in that language.

The hardware accelerator 108 can compute—for each class of the n classes (e.g. C1, C2, . . . Cn)—a probability indicating likelihood of each class in the input data slice 112 being that class. For example, in the OCR case, the hardware accelerator 108 can compute, for each language character of the n language characters (e.g. C1, C2, . . . Cn), a probability indicating likelihood of each character in the image slice 112 being that language character. The probability of C1 is denoted here as P1, probability of C2 is denoted here P2, . . . probability of Cn is denoted here as Pn. The hardware accelerator 108 then perform an algorithm (e.g. TopK algorithm) to determine the classes (e.g. characters) in the slice 112. Such determined classes (e.g. characters) for the slice 112 indicate interpretations (e.g. recognition of text) for that slice 112.

The hardware accelerator 108 can transmit the top K probabilities (which indicate the classes) 114 for the slice 112 to the host processor 106. In other implementations (not shown), the hardware accelerator 108 can store the top K probabilities for each slice 112 in a buffer within the hardware accelerator 108, and transmit the top K probabilities for all slices 112 together to the host processor 106 (rather than transmitting the top K probabilities for each slice 112 separately as they are calculated), thereby reducing the number of times the bus 109 is used for data transfer (even though the same amount of data may be transferred). Reducing the number of times the bus 109 is used can save power utilized by the hardware accelerator 108 while using the bus 109. The method performed by the hardware accelerator 108 is described in further detail below with respect to FIG. 6. The TopK algorithm implemented by the hardware accelerator 108 is described in further detail below with respect to FIG. 7.

Figure 2:
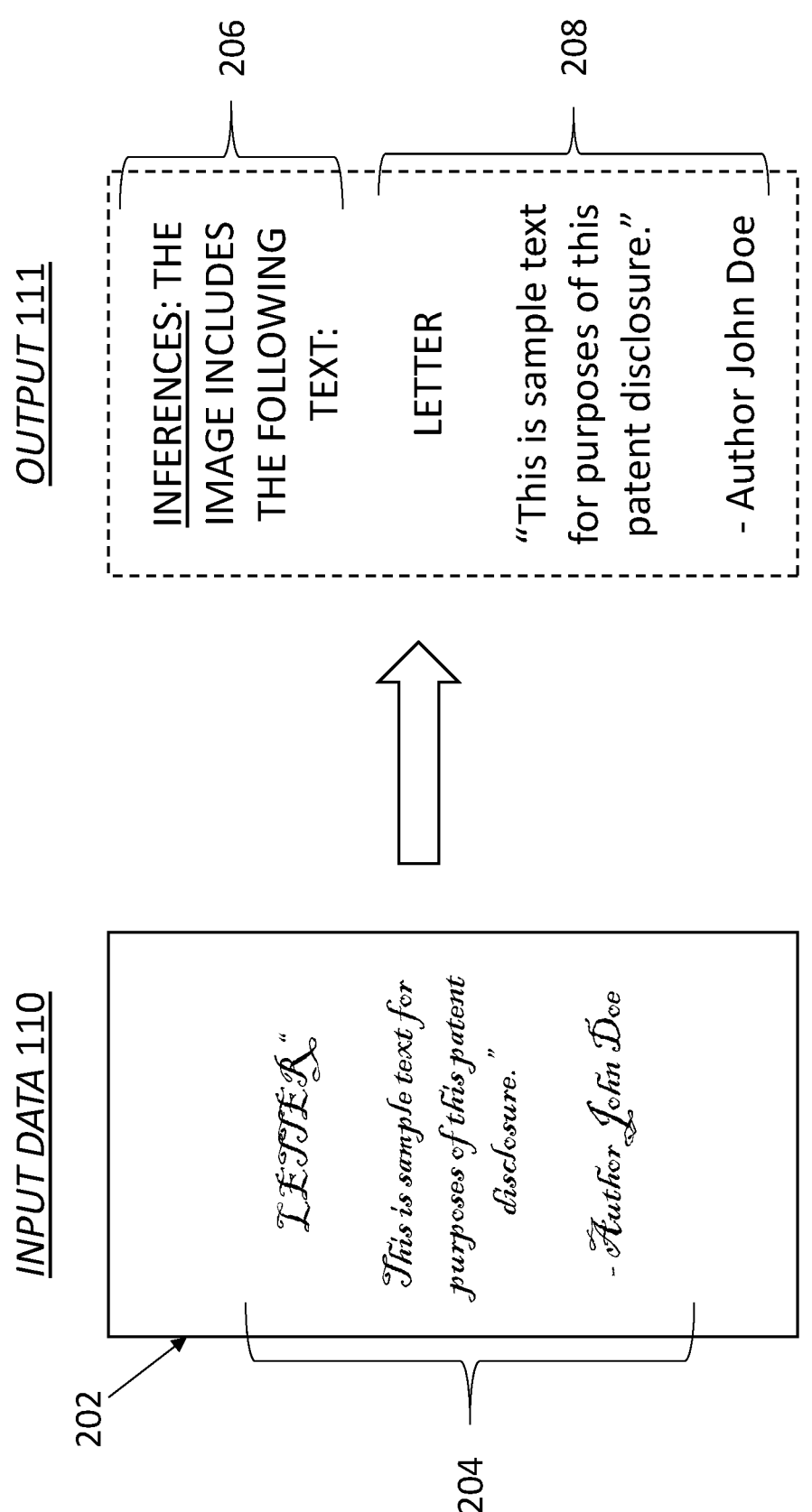
FIG. 2 illustrates an example of the input data provided by the application and output generated and sent back to the application.

FIG. 2 illustrates an OCR-specific example of the input data 110 provided by the application 104 and output 111 generated and sent back to the application 104. In this example, the input data 110 can be an image 202 that includes text 204. The image 202 can be in any image format, such as JPEG, TIFF, GIF, PNG, or any other image format. Although the text 204 in the shown implementation is typed, the text 204 can be typed, handwritten, or a combination thereof. The text 204 can have characters of any language, such as Latin, Mandarin, Hindi, and/or the like. The application 104 can receive the image 202 as an input on the computing device on which the application 104 runs.

The application 104 can provide this image 202 as input data 110 to the host processor 106. The application 110 can receive output 111 of characters in the image 202 as recognized by the hardware accelerator 108, as described below. The application 104 can display the output 111 on a graphical user interface of the computing device on which the application 104 runs. The output 111 can include general text 206 and characters 208 that have been recognized from the text 204 of the image 202. The general text 206 can be an introductory passage indicating that the text in this portion is an introduction, not a part of the characters recognized by the combination of the host processor 106 and the hardware accelerator 108.

Figure 3:
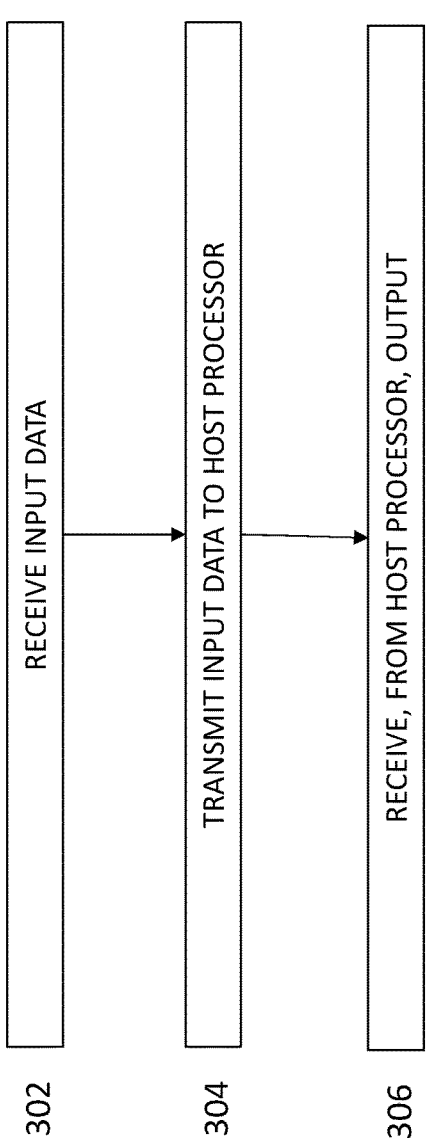
FIG. 3 illustrates a process performed by the application.

FIG. 3 illustrates a process performed by the application 104. The application 104 can receive, at 302, the input data (e.g. image 202) as an input on the computing device on which the application 104 runs. The input on the computing device 104 can be automatic from, for example, another device—such as a scanner or a camera (in the OCR case)—that is connected to the computing device via a wired or wireless connection. In some implementations, the input on the computing device can be manual. For example, in the OCR case, a user of the computing device can select the image 202 from a storage memory of the computing device, and then upload the selected image 202 to the application 104.

The application 104 can transmit, at 304, the input data 110 (e.g. image 202) to the host processor 106. The host processor 106 can, in conjunction with the hardware accelerator 108, generate output 111 of classes in the input data 110 (e.g. inference 208 of characters 204 in the image 202), as described in greater detail below with reference to FIGS. 5-7. The application 104 can receive, at 306, the output 111 indicating classes in the input data 110 (e.g. inference 208 of characters 204 in the image 202) from the host processor 106.

Figure 4:
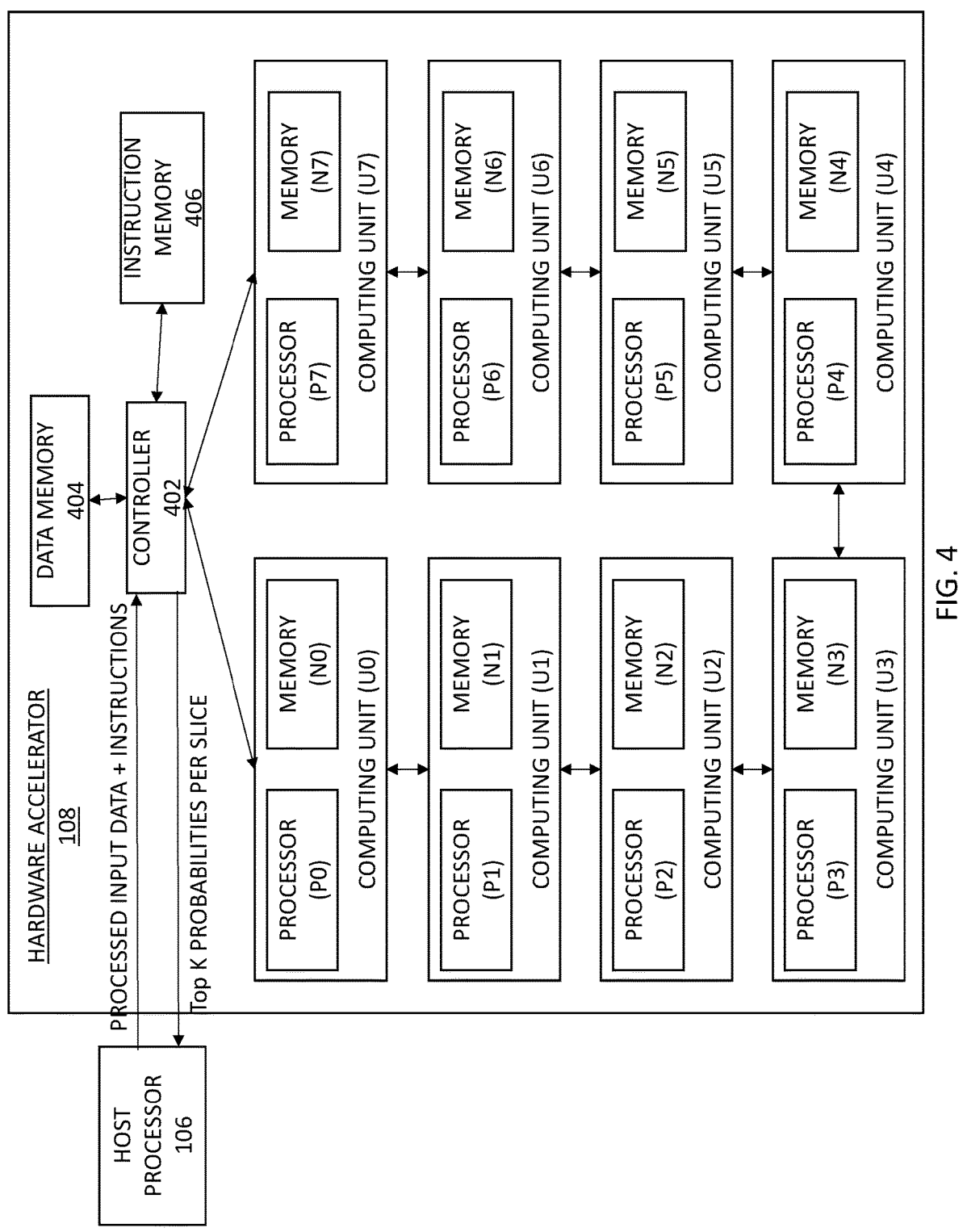
FIG. 4 illustrates hardware aspects of the accelerator, which impose structural limitations according to which input data (e.g. image of text) is sliced (i.e. divided) and provided by the host processor to the hardware accelerator in various time-steps.

FIG. 4 illustrates specifications of the hardware accelerator 108, which impose structural limitations according to which the input data 110 (e.g. image 202) is sliced and provided by the host processor 106 to the hardware accelerator 108 in various time-steps. The hardware accelerator 108 has a controller 402, a data memory 404, an instruction memory 406, and computing units U0-U7, each of which includes a corresponding processor (i.e. one of processors P0-P7) and a corresponding memory (i.e. one of memories M0-M7). Each of the computing units U0-U7 is self-contained and can independently execute computations required by a given layer of a multi-layer neural network, thereby accelerating execution of neural network models. While eight computing units U0-U7 are shown, in alternate implementations the hardware accelerator 110 can have any other number of computing units, such as any number between two and sixteen.

Because the number of computing units U0-U7 are limited, the available memory space of the accelerator is also limited. Such restrictions on available memory space limit the amount of data on which top K probabilities can be generated at one time-step, and thus multiple time-steps may be required to generate top K probabilities on the entire input data 110. Based on the limitations of storage capacity of memories M0-M7—and in some implementations additionally or alternately the processing capacity of processors P0-P7—the input data 112 needs to be sliced into slices so that top K probabilities for each slice can be generated in a single time-step. If, for example each of the memories M0-M7 is configured to store 4 bytes of data, the maximum size of each slice 112 can be 4 multiplied by 8 (which in the shown implementation is the number of memories), which is equal to 32 bytes. The size of each slice 112, and thus the slicing operation performed by the host processor 106, can vary with the storage capacity (e.g. 4 bytes in the example above, but can be a different value in other implementations) of each memory on the hardware accelerator 108 and the number of memories (e.g. 8 in the shown implementation, but can be a different number in other implementations).

The controller 402 (*a*) receives, from the host processor 106, processed input data, which includes slices 112, and instructions to generate top K probabilities 114 by computing a result (e.g. TopK output) of an algorithm (e.g. TopK algorithm) on each slice 112, (b) controls and coordinates with other components of the hardware accelerator to generate top K probabilities 114 for each slice 112, and (c) transmits the top K probabilities 114 to the host processor 106. The data memory 404 stores the processed input data, which can be the corresponding slice 112 of input data 110. In some implementations, the data memory 404 can include a buffer that can store intermittent computational results generated by the hardware accelerator 108 during execution of the algorithm to generate the top K probabilities, as explained in greater detail below. In other implementations, the hardware accelerator 108 can include a separate buffer that is physically separate from the data memory 404. In some implementations, the buffer can be, or alternately physically located within, one of the memories M0-M7. In another implementation, the buffer can be split across two or more of the memories M0-M7. The instruction memory 406 can store the instructions to generate top K probabilities 114 as received from the host processor 106.

The controller 402 can receive, from the host processor 106, an identifier identifying a category (e.g. language) associated with the input data (e.g. image of text). Based on the identifier, the hardware accelerator 108 can run a machine learning model (e.g. neural network model) associated with classes (e.g. language characters) of that category (e.g. language). The number of classes (e.g. characters) can vary for each category (e.g. language), as noted above. In the OCR example, Latin may have a few hundred (e.g. 200) characters; Mandarin may have a few thousand (e.g. 20,000) characters; and so on. For generality, each category (e.g. language) has 'n' classes (e.g. characters), where n is an integer number equal to the number of classes (e.g. characters) in that category (e.g. language).

The hardware accelerator 108 can deploy a machine learning model (e.g. neural network model) across the computing units U0-U7 to compute, for each class of the n classes (e.g. C1, C2, . . . Cn), a probability indicating likelihood of each class in the image slice 112 being that class. For example, in the OCR case, the hardware accelerator 108 can deploy a particular neural network model across the computing units U0-U7 to compute, for each language character of the n language characters (e.g. C1, C2, . . . Cn), a probability indicating likelihood of each character in the image slice 112 being that language character. The probability of C1 is denoted here as P1, probability of C2 is denoted here P2, . . . probability of Cn is denoted here as Pn. The computing units U0-U7 accelerate computation of probabilities by accelerating machine learning inference workloads of a neural network layer of the neural network model, thereby increasing processing speed and reducing latency with which inferences 114 for each slice 112, and thus also the output 111 for the entire input data 110, are generated.

The processors P0-P7 can then perform an algorithm—specifically a TopK algorithm—to determine the classes (e.g. characters 208) as top K probabilities 114 for that slice 112. The computing units U0-U7 can simultaneously perform various mathematical functionalities of the algorithm to accelerate the generation of the top K probabilities 114, thereby increasing processing speed and reducing latency with which output for each slice 112 (e.g. output showing characters recognized in each slice) is determined, and thus also the output 111 for the entire input data 110, are generated. Subsequently, the controller 402 can transmit the top K probabilities 114 for the slice 112 to the host processor 106.

In other implementations (not shown), the hardware accelerator 108 can store the top K probabilities for each slice 112 in a data buffer within the hardware accelerator 108, and transmit the top K probabilities for all slices 112 together to the host processor 106 rather than transmitting top K probabilities for each slice 112 separately as they are calculated, thereby reducing the number of times the bus 109 is used for data transfer (even though the same amount of inferred data is transferred). Reducing the number of times the bus 109 is used can save power utilized by the hardware accelerator 108 while using the bus 109.

The use of hardware accelerator 108 is further advantageous. For example, computations of the machine learning model (e.g. neural network)—which is deployed to compute respective probabilities for multiple classes (e.g. probability for each corresponding character of multiple characters of a language of the text, wherein number of classes equals to total number of characters in that language)—can be distributed across the computing units U0-U7. Such distribution of computations across the computing units U0-U7 allow processing the neural network by using a reduced number of instructions as compared to number of instructions that would have been required had the neural network been processed by the host processor 106. Such reduction in the number of instructions increases the speed with which probabilities for multiple classes are computed, thereby reducing latency in the process of generating the top K probabilities 114, which in turn reduces latency in the process of generating the output 111 in response to the input data 110 (e.g. determining and/or displaying characters recognized within an image containing text in response to receipt of such text).

FIG. 5 illustrates a process performed by the host processor 106, whereby the host processor 106 slices the input data 110 into slices 112 based on hardware specifications of the hardware accelerator 108, receives top K probabilities 114 of each slice 112, and combines the top K probabilities 114 for all the slices 112 to generate a single combined output 111 for the entire input data 110, which it then transmits to the application 104. The host processor 106 can receive, at 502 from the application (e.g. OCR application) 104, the input data 110 (e.g. image 202), along with a request to generate output based on the input data 110. The request to generate output here can be classes to be inferred from the input data 110 (e.g. characters of text that are to be recognized from the image 202).

The host processor 106 can process, at 504, the input data 110 based on structural specifications of the hardware accelerator 108. The processing of the input data 110 can include (i) determining a category associated with the input data 110 (e.g. language of the text 204 in the image 202), and (ii) slicing the input data 110 into slices 112 of input data 110, such that each slice 112 conforms to the structural specifications (more particularly, limitations imposed by the structural specifications) of the hardware accelerator 108. In the OCR example, the language can be, for example, Latin, Mandarin, Hindi, or any other language. The size of each slice 112, and thus the slicing operation performed by the host processor 106, varies with the storage capacity of each memory (i.e. each of M0-M7) on the hardware accelerator 108 and the number of memories (e.g. 8 in the implementation shown in FIG. 4, but can be a different number in other implementations).

The host processor 106 can transmit, at 506, the processed input data, which includes the slices 112, to the controller 402 of the hardware accelerator 108 in corresponding time-steps. More particularly, in each time-step, the host processor 106 transmits a single corresponding slice 112 to the controller 402.

The host processor 106 can receive, at 508 and separately—e.g. in real-time as the top K probabilities for each slice 112 are computed—for each slice 112 transmitted to the hardware accelerator 108 at a corresponding time-step, top K probabilities 114 for that slice 112 from the controller 402 of the hardware accelerator 112. The top K probabilities for each slice 112 is a result of an algorithm—specifically a TopK algorithm discussed in further detail below with respect to FIG. 7—implemented by the hardware accelerator 108 at each time-step. In other implementations (not shown), the host processor 106 can receive the inferences for all slices 112 together (rather than transmitting an inference for each slice 112 separately as it is calculated), thereby reducing the number of times the bus 109 is used for data transfer (even though the same amount of inferred data is transferred).

The host processor 106 can determine, at 510, the output for each slice based on the top K probabilities 114 for that slice. The host processor 106 can combine the outputs for each slice to determine a single combined output 111 for the entire input data 110. The host processor 106 can transmit, at 512, the single combined output 111 to the application 104. In the other implementations (not shown) where the host processor 106 receives the collective top K probabilities of all slices, the host processor 106 does not need to perform any combination, and can determine the output 111 based on the received top K probabilities for all the slices, and transmit the output 111 in a single transmission.

Figure 6:
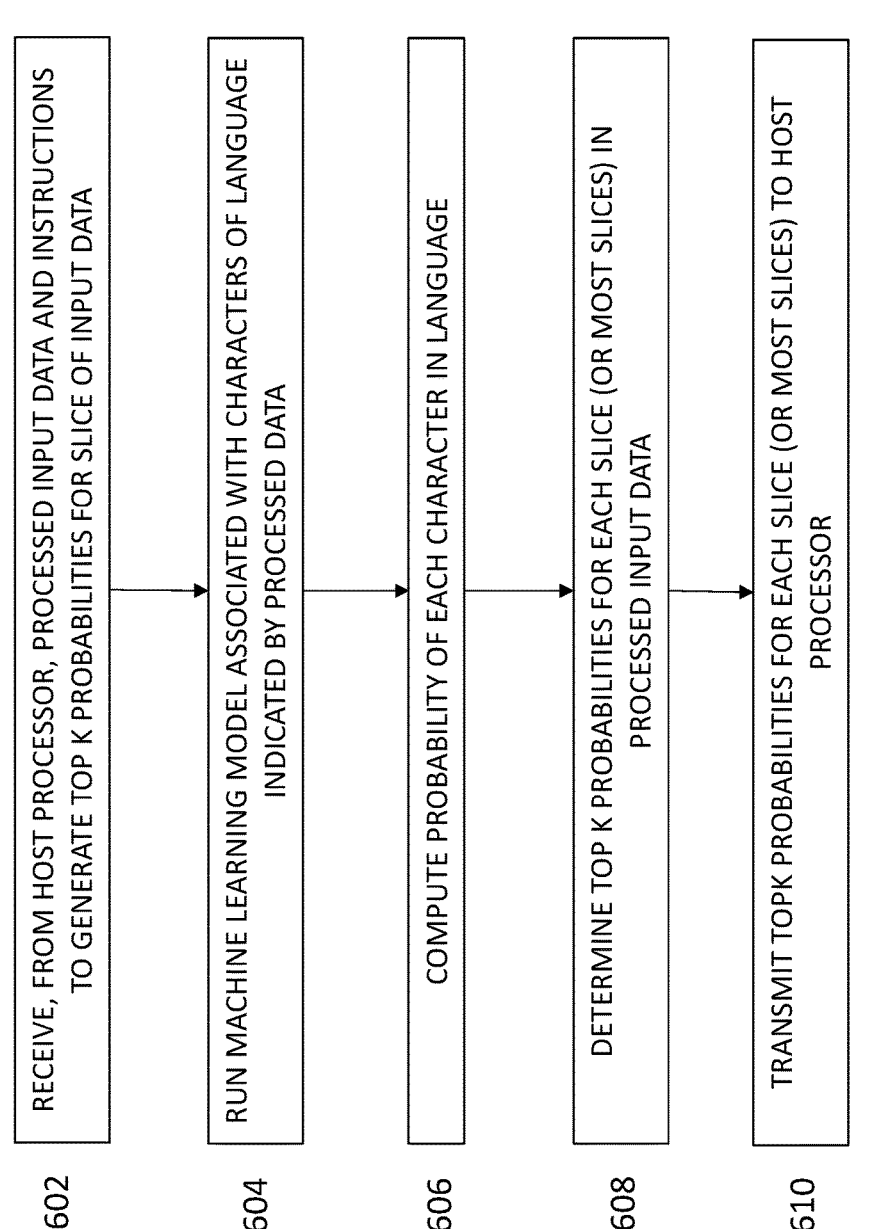
FIG. 6 illustrates another process performed by the hard-ware accelerator.

FIG. 6 illustrates a process performed by the hardware accelerator 108 to generate top K probabilities 114 for each slice 112 of the input data 110. The hardware accelerator 108 can receive, at 602 from the host processor 106, processed input data, which includes a slice 112 of the input data, in a corresponding time-step along with instructions to generate top K probabilities for the current slice 112. The processed input data also indicates the language, as determined by the host processor 106, of the text 204 in the image 202.

The hardware accelerator 108 can run, at 604, a neural network associated with all the characters of the language—indicated in the processed data—of the text 204 in the image 202. The number of characters can vary for each language. For example, Latin may have a few hundred (e.g. 200) characters; Mandarin may have a few thousand (e.g. 20,000) characters; and so on. For generality, each language has characters, where n is an integer number equal to the number of characters in that language.

The hardware accelerator 108 can compute, at 606 for each language character of the n language characters (e.g. C1, C2, . . . Cn), a probability indicating likelihood of each character in the slice 112 of the image 202 being that language character. More specifically, the hardware accelerator 108 can compute such probability by processing the slice 112 using a machine learning model, e.g., a neural network, that is configured to generate the respective probabilities for the n language characters, i.e., a neural network or other machine learning model that has been trained to perform the OCR task. For example, the neural network can be a neural network having an output layer that is aa Softmax layer or any variant thereof. The probability of C1 is denoted here as P1, probability of C2 is denoted here P2, . . . probability of Cn is denoted here as Pn. The hardware accelerator 108 can perform an algorithm (e.g. TopK algorithm) to determine, at 608, top K probabilities 114 indicating the characters in the slice 112. The hardware accelerator 108 can transmit, at 610, the top K probabilities for the slice 112 to the host processor 106.

In other implementations (not shown), the hardware accelerator 108 can store the top K probabilities for each slice 112 in a buffer within the hardware accelerator 108, and transmit the top K probabilities for all slices 112 together to the host processor 106 rather than transmitting top K probabilities for each slice 112 separately as they are calculated, thereby reducing the number of times the bus 109 is used for data transfer (even though the same amount of data may be transferred). Reducing the number of times the bus 109 is used can save power utilized by the hardware accelerator 108 while using the bus 109.

FIG. 7 illustrates an example of the algorithm (e.g. TopK algorithm) performed by the hardware accelerator 108 to generate top K probabilities 114 for the slices 112 of the input data 110. The hardware accelerator 108 can determine, at 702, 'n' probabilities for a new slice 112 of input data 110 (where n=number of classes in the category associated with the input data 110; in the OCR case, n=number of characters in the language of the text 204 in the image 202). More specifically, the hardware accelerator 108 can compute, for each class of then n classes (e.g. for each language character of then language characters, say C1, C2, . . . Cn), a probability indicating likelihood of each class (e.g. character) in the slice 112 being that class (e.g. language character). The probability of C1 is denoted here as P1, probability of C2 is denoted here P2, . . . probability of Cn is denoted here as Pn. The hardware accelerator 108 then arranges the probabilities in order of then classes (e.g. n language characters)—i.e. P1, P2, P3, P4, . . . Pn.

In the OCR example, as many text images have empty area where there is no text, several slices are likely to not include any characters. The hardware accelerator 108 can determine, at 704, if the current slice is unlikely to include any characters. In some examples, the hardware accelerator 108 can implement a separate, less computationally-intensive machine learning model that may be configured only to determine whether there are any classes present in a given slice, e.g., any characters present in a given image slice.

In some implementations, the hardware accelerator 108 can determine that that there is no class (e.g. character) in that slice 112 and transmit, at 706, a simple token (e.g. one or more bits or bytes indicating that the slice has no textual data) to the host processor 106. In the OCR example, when the slice 112 corresponds to part of an image that has no text, no characters needs to be determined, and thus computations of the top K algorithm to compute top K probabilities are not required. The hardware accelerator 108 can accordingly quickly determine a result (here, the above-referenced token) for such slices 112 of input data without performing computations of the TopK algorithm, which can be intensive, thereby reducing latency and saving computational and power resources. Furthermore, transmission of the token requires significantly less bandwidth than transmission of top K probabilities, which further conserves computing and power resources.

The hardware accelerator can determine, at 708, "K" highest probabilities among those n probabilities. K can be any fixed integer. In some implementations, the integer K can have any value from 1 to 20. In some implementations, the architecture of the hardware accelerator 108 may not allow the arrangement of all probabilities and generation of top K in a single time-step corresponding to a respective slice of input data, which is because of the limited storage capacity on the hardware accelerator. In such case, batches of probabilities (e.g. batches of N, e.g., 4, 6, 8, or 10 probabilities) may iteratively be compared to determine the K highest probabilities within that batch. The hardware accelerator can store the K highest probabilities in a buffer.

Subsequently, the probabilities may continuously be compared with the K highest probabilities that are stored in the buffer (e.g. as those probabilities are computed by or retrieved from the neural network model) until the entire set of n probabilities have been compared. In some implementations, the batches are prepared by a designated computing unit (which can also be referred to as a compute tile) within the hardware accelerator 108, whereby that designated computing unit within the hardware accelerator 108 divides the probabilities into batches. In some instances, different compute tiles can perform different parts of the comparison in parallel. For example, different compute tiles can construct the set of batches in parallel or can compare two different batches against the buffer in parallel. If a new probability has a value more than the lowest among the K highest probabilities in the buffer, that new probability replaces (i.e. overwrites) that lowest probability in the buffer. While each new probability is shown as being compared to the K probabilities in the buffer, in other implementations the hardware accelerator may wait until another batch of probabilities has been computed and once computed those probabilities may be compared with those in the buffer to determine the K highest probabilities. The hardware accelerator 108 may discard, from the storage in the hardware accelerator, probabilities that have been considered but either do not make it to the buffer or have been removed from the buffer.

In some implementations, prior to comparing a batch against the probabilities stored in the buffer, the hardware accelerator 108 may first determine whether all N probabilities in the batch are zero. If so, the hardware accelerator 108 can discard or otherwise refrain from comparing any of the probabilities in the batch against the K probabilities stored in the buffer.

This process continues until all n probabilities within the time-step have been considered in that time-step. In alternate implementations where the architecture of the hardware accelerator 108 allows the arrangement of all n probabilities and generation of top K in a single time-step, these functions (i.e. arrangement and generation of top K probabilities) may be performed within a single time-step corresponding to the slice.

The value of K can depend on the type of application 104, and how the slicing is performed. For example, for the OCR application, if slicing is performed such that each slice 112 includes a single character of the text 204, the value of K may be 1 and thus the TopK is Top1. Furthermore, the value "K" can be based on an optimal tradeoff—i.e. K must be high enough for the highest accuracy (as a high value of K prevents losing false negatives) and low enough to ensure efficiency based on hardware limitations of the hardware accelerator. Note however that the value of K equal to 1 is based on an assumption that the machine learning model (e.g. neural network model) rarely misclassifies a character within the text in the image (because top 1 does not consider the character with the second highest probability, even if that probability is close to the first probability). This assumption can be made substantially safe by improving the detection of neural network model by training it extensively on characters written and typed in many different fonts and styles with various editing options (which can avoid e.g. making errors such as mixing-up between an 'm' and a 'n' while recognizing text in the input image).

The hardware accelerator 108 can generate top K probabilities 114 based on the probabilities. The hardware accelerator 108 can transmit, at 710, the top K probabilities 114 for the slice 112 to the host processor 106. The host processor 106 can generate an output indicating the class (e.g. character) by comparing/referring the top K probabilities with an index mapping the slice 112 and corresponding top K probabilities for that slice 112.

The hardware accelerator 108 can determine, at 712, whether there are additional slices 112 within the input data 110. If there are no additional slices, the hardware accelerator 108 may stop, at 714, the algorithm. If there are additional slices, the hardware accelerator 108 can determine, at 716, 'n' probabilities for the next slice 112 of input data 110, as was done at 702 for the previous slice. The hardware accelerator 108 then passes the control to 704.

In the implementation described above, the hardware accelerator 108 transmits/sends top K probabilities 114 for each slice to the host processor 106 in real-time (i.e. as soon as top K probabilities 114 for that slice are determined). In other implementations (not shown), the hardware accelerator 108 can store the top K probabilities for each slice 112 in a buffer within the hardware accelerator 108, and transmit the top K probabilities for all slices 112 together to the host processor 106 (rather than transmitting top K probabilities for each slice 112 separately as it is calculated), thereby reducing the number of times the bus 109 is used for data transfer (even though the same amount of data may be transmitted over the bus). Reducing the number of times the bus 109 is used can save power utilized by the hardware accelerator 108 while using the bus 109.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output(s). The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Although a few variations have been described in detail above, other modifications can be possible. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other implementations are within the scope of the following claims.

What is claimed is:

1. A method comprising:
   receiving, by a hardware accelerator from a host processor, a slice of input data at a time-step, wherein the input data is an image including text in a particular language, wherein the slice of input data is determined based on structural limitations of the hardware accelerator;
   processing, by the hardware accelerator, the input data using a machine learning model deployed on the hardware accelerator to compute a respective probability of a plurality of probabilities for each of a plurality of classes, wherein the plurality of classes comprises a plurality of characters in the particular language, wherein the respective probability for each class is a likelihood that content in the slice belongs to the class;
   determining, by the hardware accelerator and from the plurality of probabilities, a preset number of highest probabilities for the slice of input data; and
   transmitting, by the hardware accelerator, the preset number of highest probabilities for the slice to the host processor.

2. The method of claim 1, wherein the host processor receives the input data from an application configured to be executed on a computing device implementing the host processor and the hardware accelerator.

3. The method of claim 2, wherein the host processor transmits data characterizing the preset number of highest probabilities to the application.

4. The method of claim 1, wherein the hardware accelerator is communicatively coupled to the host processor via a Peripheral Component Interconnect Express (PCIe) bus.

5. The method of claim 1, wherein the hardware accelerator stores the preset number of highest probabilities for the time-step within a buffer of the hardware accelerator.

6. The method of claim 1, wherein a total count of the probabilities is equal to a total number of classes.

7. The method of claim 1, wherein the preset number is one.

8. The method of claim 1, wherein the input data comprises one or more other slices in addition to the input slice, the method further comprising:
   for each other slice, determining, by the hardware accelerator and from the plurality of probabilities, the preset number of highest probabilities for the other slice; and
   storing, by the hardware accelerator, the preset number of highest probabilities for each of the other slices; and
   wherein the transmitting comprises:
   transmitting, by the hardware accelerator, the preset number of highest probabilities for each of the slices of the input data collectively to the host processor, the host processor using the preset number of highest probabilities for a slice.

9. The method of claim 8, wherein the hardware accelerator stores the preset number of highest probabilities for the time-step within a buffer of the hardware accelerator.

10. A hardware accelerator comprising:
    at least one compute unit; and
    a machine-readable medium storing instructions that, when executed by the at least one compute unit, cause the at least one compute unit to perform operations, the operations comprising:
    receiving a slice of input data at a time-step wherein the input data is an image including text in a particular language, wherein the slice of input data is determined based on structural limitations of the hardware accelerator;
    processing the input data using a machine learning model deployed on the hardware accelerator to compute a respective probability of a plurality of probabilities for each of a plurality of classes, wherein the plurality of classes comprises a plurality of characters in the particular language, wherein the respective probability for each class is a likelihood that content in the slice belongs to the class; and
    determining a preset number of highest probabilities for the slice of input data, wherein the preset number of highest probabilities for the slice are transmitted to a host processor.

11. The hardware accelerator of claim 10, wherein the host processor receives the input data from an application configured to be executed on a computing device implementing the host processor and the hardware accelerator.

12. The hardware accelerator of claim 11, wherein the host processor transmits data characterizing the preset number of highest probabilities to the application.

13. The hardware accelerator of claim 10, wherein the hardware accelerator is communicatively coupled to the host processor via a Peripheral Component Interconnect Express (PCIe) bus.

14. The hardware accelerator of claim 10, wherein the input data comprises one or more other slices in addition to the input slice, the operations further comprising:

for each other slice, determining, by the hardware accelerator and from the plurality of probabilities, the preset number of highest probabilities for the other slice; and storing, by the hardware accelerator, the preset number of highest probabilities for each of the other slices; and wherein the transmitting comprises:

transmitting, by the hardware accelerator, the preset number of highest probabilities for each of the slices of the input data collectively to the host processor, the host processor using the preset number of highest probabilities for a slice.

15. The hardware accelerator of claim 14, wherein the hardware accelerator stores the preset number of highest probabilities for the time-step within a buffer of the hardware accelerator.

16. A non-transitory computer program product storing instructions that, when executed by at least one compute unit, cause the at least one compute unit to perform operations, the operations comprising:

receiving a slice of input data at a time-step, wherein the input data is an image including text in a particular language, wherein the slice of input data is determined based on structural limitations of the hardware accelerator;

processing the input data using a machine learning model deployed on the hardware accelerator to compute a respective probability of a plurality of probabilities for each of a plurality of classes, wherein the plurality of classes comprises a plurality of characters in the particular language, wherein the respective probability for each class is a likelihood that content in the slice belongs to the class; and determining a preset number of highest probabilities for the slice of input data, wherein the preset number of highest probabilities for the slice are to be transmitted to a host processor.

17. The non-transitory computer program product of claim 16, wherein the host processor receives the input data from an application configured to be executed on a computing device implementing the host processor and the hardware accelerator.

18. The non-transitory computer program product of claim 17, wherein the host processor transmits data characterizing the preset number of highest probabilities to the application.

19. The non-transitory computer program product of claim 17, wherein the hardware accelerator is communicatively coupled to the host processor via a Peripheral Component Interconnect Express (PCIe) bus.

20. The non-transitory computer program product of claim 17, wherein the input data comprises one or more other slices in addition to the input slice, the operations further comprising:

for each other slice, determining, by the hardware accelerator and from the plurality of probabilities, the preset number of highest probabilities for the other slice; and storing, by the hardware accelerator, the preset number of highest probabilities for each of the other slices; and wherein the transmitting comprises:

transmitting, by the hardware accelerator, the preset number of highest probabilities for each of the slices of the input data collectively to the host processor, the host processor using the preset number of highest probabilities for a slice.

* * * * *